UNITED STATES PATENT OFFICE.

HARRY P. BASSETT, OF CATONSVILLE, MARYLAND.

TREATMENT OF ALUMINUM-BEARING MATERIALS.

1,095,306. Specification of Letters Patent. Patented May 5, 1914.

No Drawing. Application filed January 31, 1912. Serial No. 674,470.

*To all whom it may concern:*

Be it known, that I, HARRY P. BASSETT, a citizen of the United States, residing at Catonsville, in the county of Baltimore and State of Maryland, have invented certain new and useful Improvements in the Treatment of Aluminum-Bearing Materials, of which the following is a specification.

This invention relates to the treatment of aluminum bearing material, such as clay, sodium feldspar, potassium feldspar, granite, and the like, and has for its principal object to provide an economical process for the separation of aluminum from such aluminum bearing material.

Other objects and advantages of the invention will appear in the course of the following specification.

In the practice of my process I add to the clay, rock, or other aluminum bearing material, an alkali preferably sodium carbonate and an alkali chlorid preferably sodium chlorid and furnace the mixture preferably to the point of fusion, which occurs at about a low red heat.

I have found that satisfactory results are obtained by mixing the clay, rock or other aluminum bearing material with the reagents mentioned, in the following proportions by weight: Clay or aluminum bearing rock, 5 parts; sodium carbonate, 3 parts; sodium chlorid, 2 parts. When the mixture is heated the reaction which occurs is believed to be represented by the following equation:—

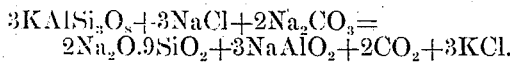

The furnaced mixture is then extracted with water which dissolves sodium aluminate ($NaAlO_2$), and potassium chlorid (KCl), leaving an undissolved residue of sodium silicate ($2Na_2O.9SiO_2$).

In order to effect the separation of the aluminum from the solution, I carbonate it preferably by passing carbon dioxid gas through such solution, which reacting upon the sodium aluminate present, precipitates the aluminum as aluminum hydroxid ($Al(OH)_3$), in the form of a gelatinous mass as indicated by the following equations:—

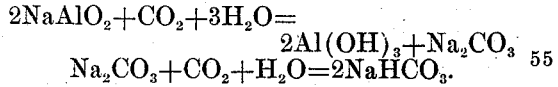

The gelatinous precipitate of aluminum hydroxid is separated from the solution, preferably by centrifugal action, and may be dried, but is preferably treated with a suitable alkali as sodium carbonate and the aluminum obtained in the form of sodium aluminate.

In the treatment of clay, feldspar, or other aluminum bearing materials which contain potash, I am able, in the practice of my process, to separate the potash present, as well as the aluminum. Where potash is present in the material under treatment, it will be found to be in solution after the precipitation of the aluminum hydroxid, as hereinbefore described, the treatment hereinbefore set forth being applicable to the treatment of potash bearing materials as well as those containing no potash, the equation given above showing the reaction which is believed to take place when potash feldspar is used.

Where potash containing materials are treated there remains in solution as described, after the separation of the aluminum hydroxid, sodium bi-carbonate (NaHCO), potassium bi-carbonate ($KHCO_3$), and sodium chlorid (NaCl). To this solution is added caustic alkali, preferably sodium hydroxid in sufficient amount to transform the sodium bi-carbonate and potassium bi-carbonate present into sodium carbonate and potassium carbonate in accordance with the following equations:

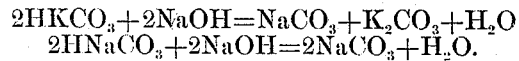

After the treatment with the sodium hydrate the solution will contain sodium carbonate, potassium carbonate, and sodium chlorid. This is heated to preferably above 60° C. to partially evaporate the solution and precipitate the sodium carbonate and sodium chlorid. The liquid residue contains the potassium carbonate in solution, and the potash is thus separated from the other components of the material under treatment. The sodium carbonate and sodium chlorid precipitated from the solution upon evaporation, are in substantially the proportions in which these salts are added to the aluminum bearing materials under treatment so that these reagents are recovered and may be used over and over again with only such loss as occurs in mechanical manipulation.

The sodium silicate ($Na_2SiO_3$) hereinbefore referred to, may be advantageously heated with a sodium salt, preferably sodium carbonate, to fusion, and dissolved in water to form water-glass, the silica present in the material under treatment being thus separated and recovered in this readily salable form.

From the foregoing it will be seen that I have provided a process for the economical separation of aluminum from clay, feldspar, and the like, and that my process enables me to economically separate potash where such potash is contained in the aluminum bearing materials under treatment. It will also be noted that my process whether applied to feldspars, clays, or the like containing potash or free from potash, enables me to effect the economical separation of the silica content of the materials under treatment.

While I have described specifically the materials which I prefer to use and the proportions which I prefer to employ, it is to be understood that the chemical equivalents of such materials may be used, and that the proportions may be widely varied without departing from the spirit of my invention or the scope of the appended claims.

Having thus described my invention, what I claim as new and desire to secure by Letters Patent, is:—

1. The herein described process of treating clay, feldspar, and other aluminum bearing materials containing aluminum in an insoluble form, which consists in heating to a reacting temperature a furnace charge consisting substantially of aluminous material, an alkali and an alkali metal chlorid, thereby producing a water soluble aluminum compound and extracting the soluble portion of the treated mass with water.

2. The herein described process of treating clay, feldspar, and other aluminum bearing materials containing aluminum in an insoluble form, which consists in heating to a reacting temperature, a furnace charge consisting substantially of aluminous material, sodium carbonate and sodium chlorid, thereby producing a water soluble aluminum compound and extracting the soluble portion of the treated mass with water.

3. The herein described process of treating clay, feldspar, and other aluminum bearing materials containing aluminum in an insoluble form, which consists in heating the same with not to exceed an equal part by weight of a mixture of sodium carbonate and sodium chlorid, the sodium carbonate and sodium chlorid being present in such mixture in approximately the proportions of three parts by weight of the former and two parts by weight of the latter and extracting the soluble portion of the treated mass with water.

4. The herein described process of treating clay, feldspar, and other aluminum bearing materials containing aluminum in an insoluble form which consists in heating the same with an alkali and an alkali chlorid thereby producing a water soluble aluminum compound, extracting the soluble portion of the treated mass with water, carbonating the resulting solution to effect the precipitation of the aluminum present, separating the aluminous precipitate, adding a caustic alkali to the remaining solution to transform the sodium bi-carbonate and potassium bi-carbonate present into sodium carbonate and potassium carbonate, partially evaporating the solution to effect the precipitation of the sodium carbonate and sodium chlorid, and separating such precipitate from the remaining solution.

In testimony whereof I affix my signature in presence of two witnesses.

HARRY P. BASSETT.

Witnesses:
C. L. PARKER,
JAMES L. CRAWFORD.